United States Patent
Tiwari et al.

(10) Patent No.: US 10,100,721 B2
(45) Date of Patent: Oct. 16, 2018

(54) APPARATUS AND SYSTEM FOR DIRECTING EXHAUST GAS FLOW

(71) Applicant: General Electric Company, Schenectady, NY (US)

(72) Inventors: Shishir Tiwari, Erie, PA (US); Douglas C. Hofer, Clifton Park, NY (US); Shashi Kiran, Lawrence Park, PA (US); Jessica Lynn Plummer, Prospect, PA (US); Shridhar Shrikant Kulkarni, Lawence Park, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/952,748

(22) Filed: Nov. 25, 2015

(65) Prior Publication Data
US 2016/0076437 A1    Mar. 17, 2016

Related U.S. Application Data

(63) Continuation-in-part of application No. 13/026,866, filed on Feb. 14, 2011, which is a continuation-in-part (Continued)

(51) Int. Cl.
*F01N 5/04* (2006.01)
*F02B 37/02* (2006.01)
(Continued)

(52) U.S. Cl.
CPC ............ *F02B 37/02* (2013.01); *F01N 13/011* (2014.06); *F01N 13/1805* (2013.01);
(Continued)

(58) Field of Classification Search
CPC .. F01N 13/1805; F01N 2590/08; F02B 75/22; F02B 65/00
See application file for complete search history.

(56) References Cited

U.S. PATENT DOCUMENTS 2,784,549 A    3/1957 Henney
4,022,019 A    5/1977 Garcea
(Continued)

FOREIGN PATENT DOCUMENTS

EP    2314834 A1    4/2011
WO    9202715 A1    2/1992
WO    2010016381 A1    2/2010

OTHER PUBLICATIONS

ISA European Patent Office, International Search Report and Written Opinion Issued in Application No. PCT/US2011/059912, dated Feb. 16, 2012, WIPO, 10 pages.
(Continued)

*Primary Examiner* — Mark Laurenzi
*Assistant Examiner* — Jason Sheppard
(74) *Attorney, Agent, or Firm* — GE Global Patent Operation; John A. Kramer

(57) ABSTRACT

Various systems are provided for supporting an exhaust gas treatment system vertically above an engine in an engine system. In one example, an engine system includes an engine; a support structure including a base and a plurality of mounting legs, a first end of each mounting leg of the plurality of mounting legs coupled to the base and an opposite, second end of each mounting leg of at least a portion of the plurality of mounting legs coupled to the engine, where at least three mounting legs of the plurality of mounting legs and the base form two triangles within a same plane of the support structure; and an exhaust gas treatment system positioned vertically above and mounted on the engine via the support structure.

23 Claims, 7 Drawing Sheets

Related U.S. Application Data of application No. PCT/US2010/061681, filed on Dec. 21, 2010.

(51) Int. Cl.
| | |
|---|---|
| *F02B 65/00* | (2006.01) |
| *F02B 75/22* | (2006.01) |
| *F01N 13/18* | (2010.01) |
| *F02B 37/00* | (2006.01) |
| *F01N 13/00* | (2010.01) |

(52) U.S. Cl.
CPC .............. *F02B 37/00* (2013.01); *F02B 65/00* (2013.01); *F02B 75/22* (2013.01); *F01N 2470/14* (2013.01); *F01N 2590/08* (2013.01); *Y02T 10/144* (2013.01)

(56) References Cited

U.S. PATENT DOCUMENTS

| | | | |
|---|---|---|---|
| 4,866,932 A | 9/1989 | Morita et al. | |
| 5,214,253 A | 5/1993 | Houston, Jr. | |
| 5,325,666 A | 7/1994 | Rutschmann | |
| 5,582,002 A | 12/1996 | Pattas | |
| 6,205,778 B1 | 3/2001 | Akaba et al. | |
| 6,820,417 B2 | 11/2004 | May et al. | |
| 7,334,400 B2 | 2/2008 | Yan et al. | |
| 8,635,864 B2 | 1/2014 | Yamamoto | |
| 2004/0046391 A1 | 3/2004 | Vasudeva | |
| 2008/0264048 A1 | 10/2008 | Nishiyama et al. | |
| 2009/0044531 A1 | 2/2009 | Lu et al. | |
| 2013/0125524 A1 | 5/2013 | Plummer et al. | |
| 2016/0090902 A1* | 3/2016 | Svihla ................... | F01N 13/107 105/62.1 |

OTHER PUBLICATIONS

Office Action issued in connection with corresponding CA Application No. 2826842 dated Jul. 20, 2017.

Kulkarni, et al., Emissions contol systems and methods, GE Copending U.S. Appl. No. 61/255,541, filed Dec. 21, 2009.

* cited by examiner

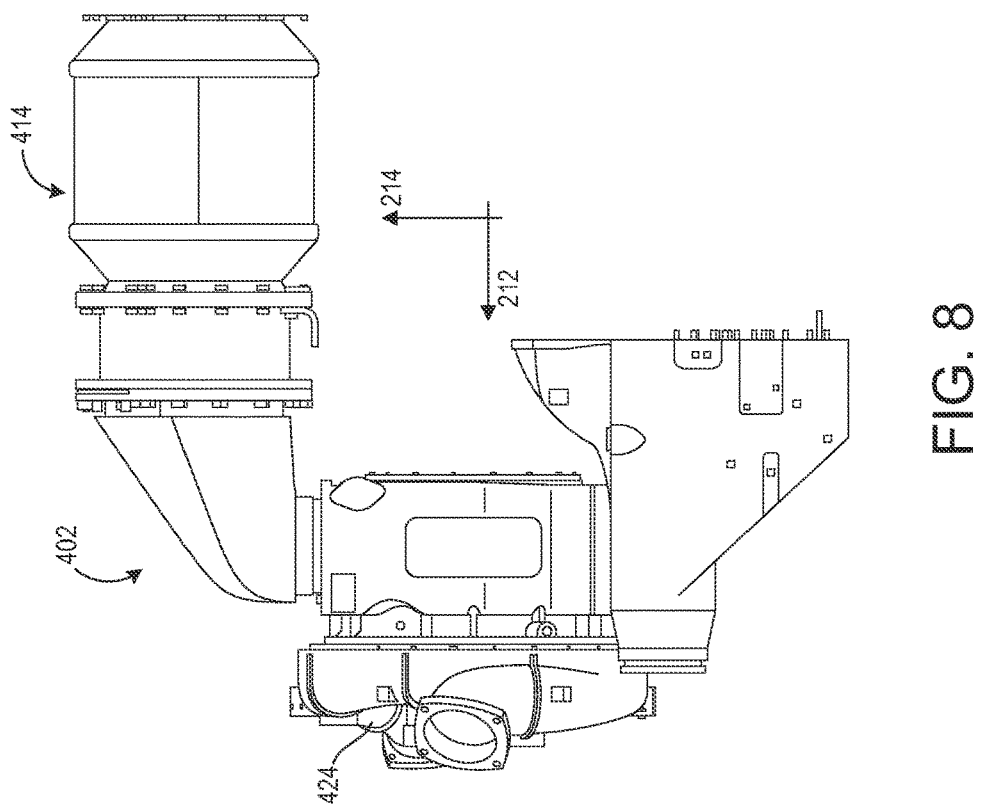
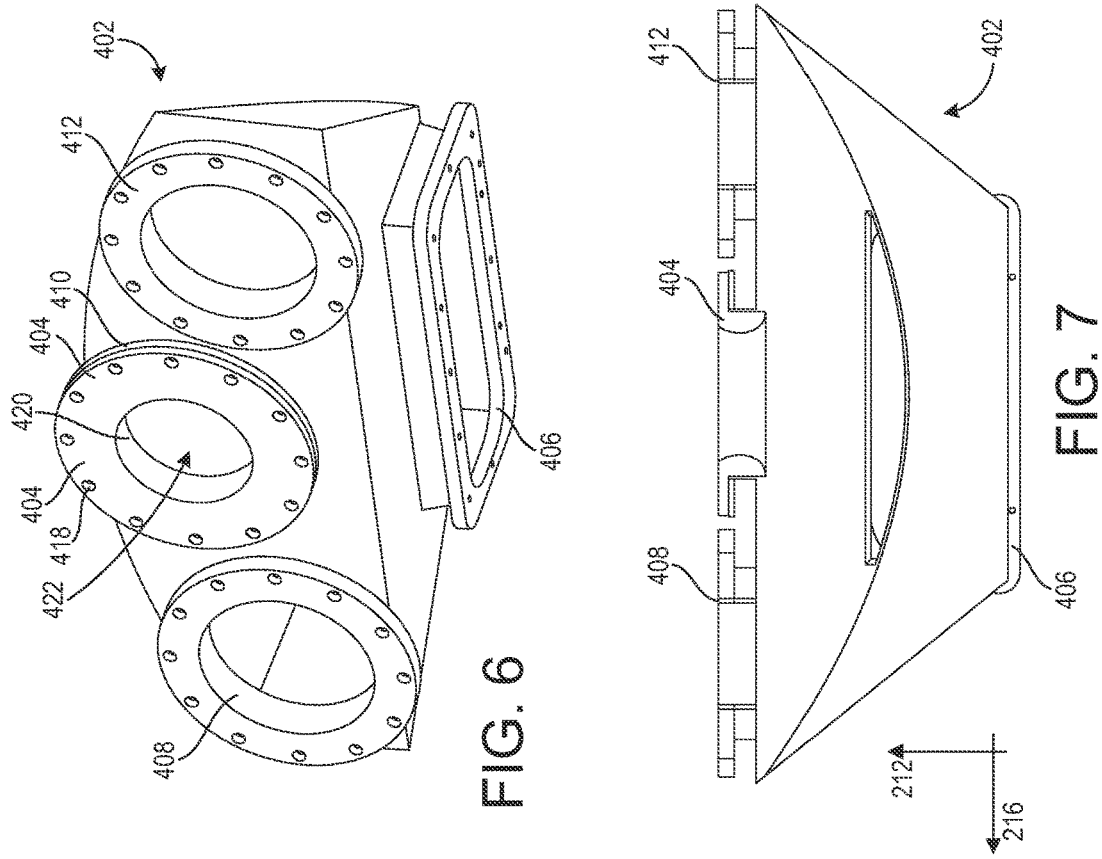

APPARATUS AND SYSTEM FOR DIRECTING EXHAUST GAS FLOW

CROSS REFERENCE TO RELATED APPLICATIONS

This application is a continuation-in-part from U.S. application Ser. No. 13/026,866, filed Feb. 14, 2011, which is a continuation-in-part of International Application Number PCT/US10/61681, filed Dec. 21, 2010, the entirety of each of which are hereby incorporated herein by reference.

FIELD

Embodiments of the invention relate to exhaust gas systems for an engine. Other embodiments relate to apparatuses and systems for controlling a flow of exhaust gas.

BACKGROUND

During operation, internal combustion engines generate various combustion by-products that are emitted from the engine in an exhaust gas stream. As such, an exhaust gas treatment system is included in an exhaust system of the engine in order to reduce regulated emissions, for example. In some examples, the exhaust gas treatment system may include a plurality of legs, each including one or more exhaust gas treatment devices, through which the exhaust gas stream is distributed. In such an example, it may be desirable to distribute portions of the exhaust gas stream to each of the plurality of legs as desired (e.g., equal distribution of flow). Further, structural requirements may limit the space in which the exhaust gas stream is distributed, thereby increasing a likelihood of an unequal distribution of the exhaust gas stream across the plurality of legs.

BRIEF DESCRIPTION OF THE INVENTION

In one embodiment, an apparatus includes an expansion plenum with a plurality of outlets directing flow in a common first direction, and an inlet receiving flow in a second direction angled with respect to the first common direction. The apparatus further includes at least one mating structure operatively coupled to one of the plurality of outlets, the at least one mating structure configured to provide a determined amount of exhaust gas to an exhaust gas treatment system.

In such an embodiment, the expansion plenum allows for the flow of exhaust gas to expand from the inlet to the plurality of outlets, thereby reducing a velocity of the exhaust gas flow. Further, with the mating structure coupled to one or more of the plurality of outlets, an amount of flow through the outlets can be distributed to provide a determined amount of flow for each outlet. For example, if the mating structure restricts the flow through one of the outlets, flow may be increased in the other outlets. In this way, a portion of exhaust gas that flows through each outlet and into the exhaust gas treatment system is controlled such that, for example, each outlet may provide a substantially equal amount of exhaust gas to the exhaust gas treatment system.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 6 shows a cut away view, approximately to scale, of an example embodiment of a plenum with a mating structure.

FIG. 7 shows a perspective view, approximately to scale, of an example embodiment of a plenum with a mating structure.

FIG. 8 shows a perspective view, approximately to scale, of an example embodiment of a plenum coupled between a turbocharger and an exhaust gas treatment system.

DETAILED DESCRIPTION

Figure 1:
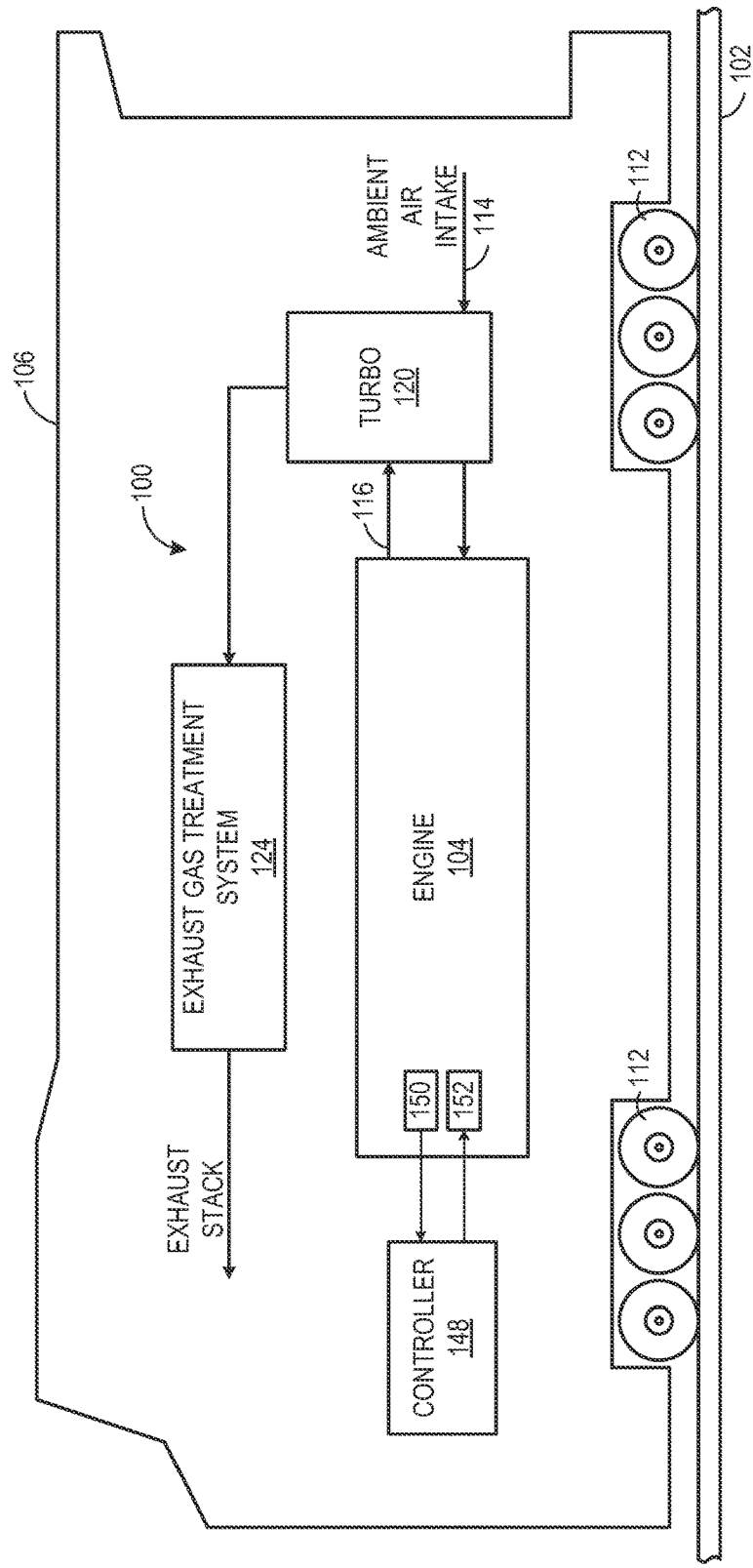
FIG. 1 shows a schematic diagram of an example embodiment of a rail vehicle with an engine system according to an embodiment of the invention.
Figure 2:
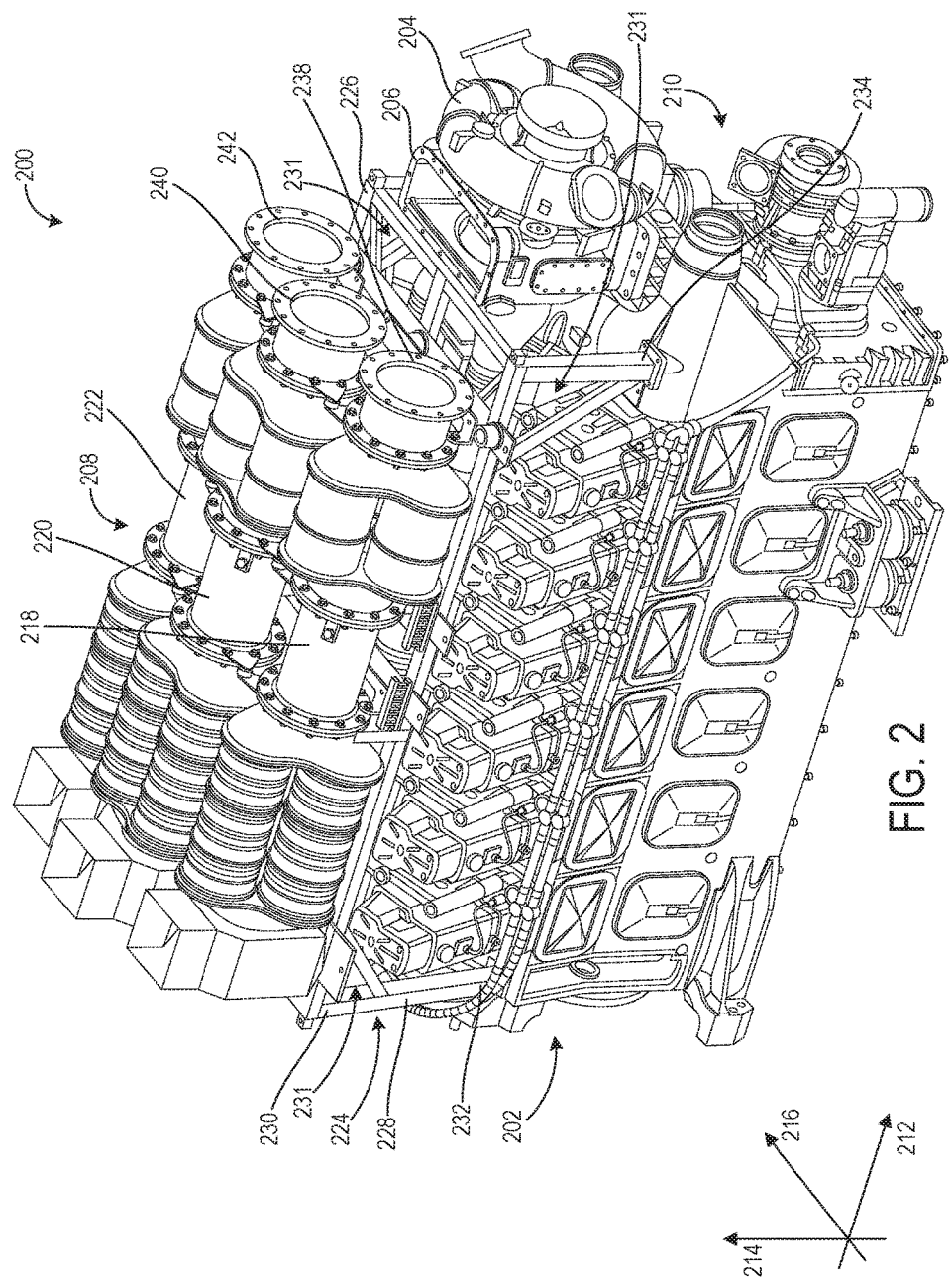
FIG. 2 shows a perspective view, approximately to scale, of an engine with a turbocharger and an aftertreatment system.
Figure 3:
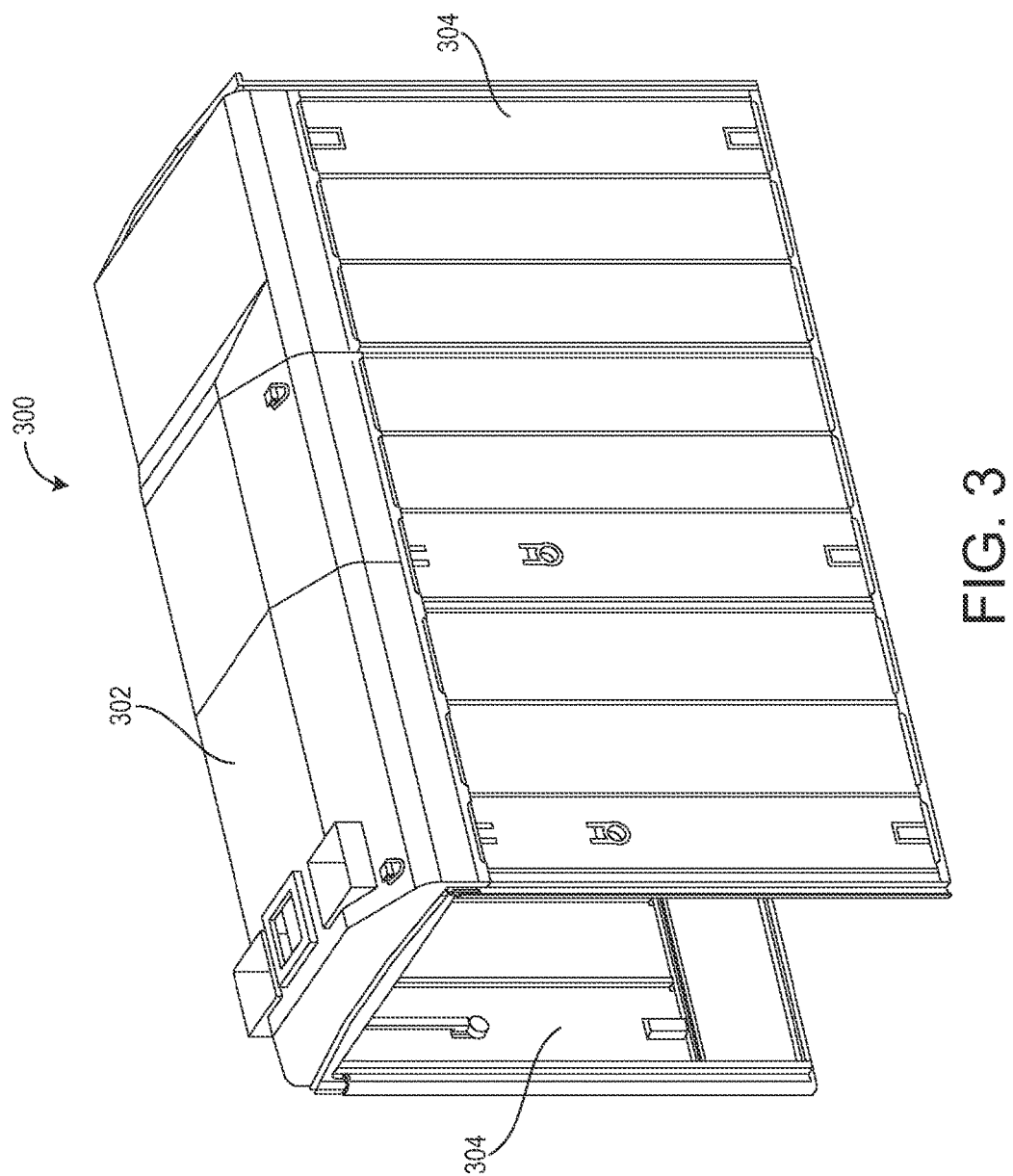
FIG. 3 shows a perspective view, approximately to scale, of an example embodiment of an engine cab.
Figure 4:
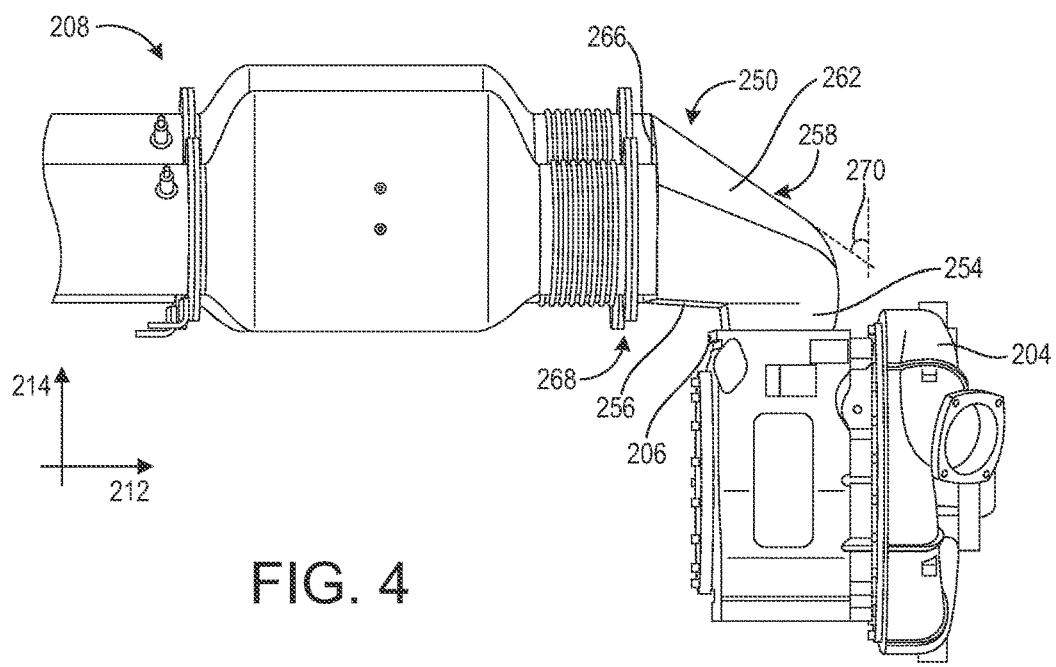
FIG. 4 shows a side view, approximately to scale, of an example embodiment of a plenum coupled between a turbocharger and an exhaust gas treatment system.
Figure 5:
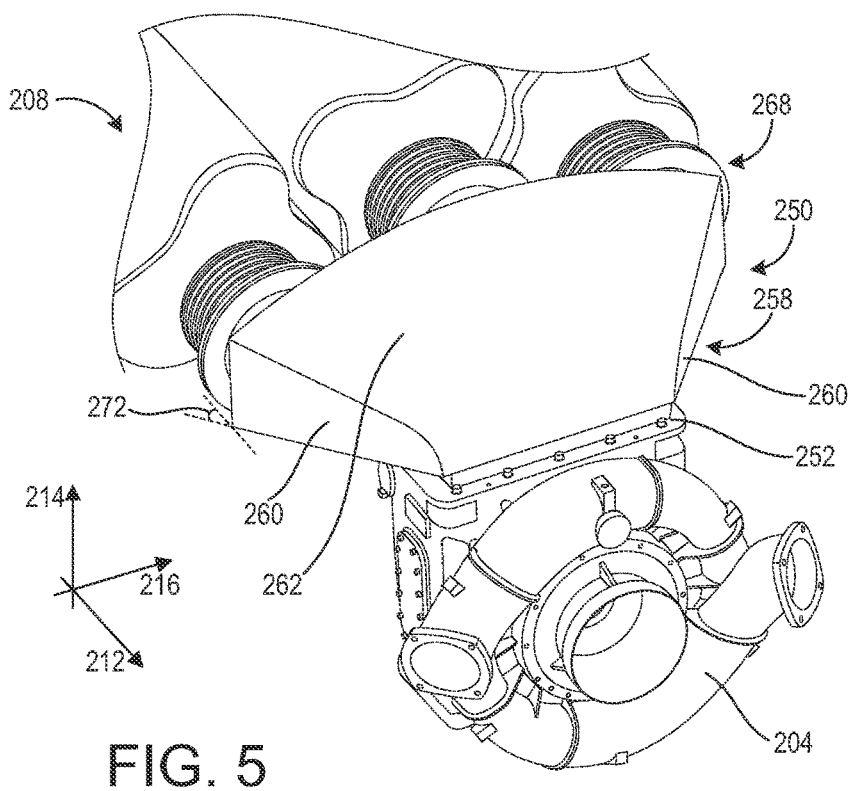
FIG. 5 shows a perspective view, approximately to scale, of an example embodiment of a plenum coupled between a turbocharger and an exhaust gas treatment system.

The following description relates to various embodiments of an apparatus for directing exhaust gas flow between a turbocharger and an exhaust gas treatment system. In some embodiments, the apparatus is configured for an engine system in a vehicle, such as a rail vehicle. In other embodiments, other vehicles may be used. FIG. 1 shows a schematic diagram of an example rail vehicle in which the apparatus may be positioned. A perspective view of an engine and exhaust gas treatment system that may be included in the rail vehicle depicted in FIG. 1 is shown in FIG. 2. An engine cab in which the engine and exhaust gas treatment system may be disposed is shown in FIG. 3. FIGS. 4 and 5 show views of an example embodiment of the apparatus coupled between a turbocharger and an exhaust gas treatment system. In some embodiments, the apparatus may include one or more mating structures, as illustrated FIGS. 6-8. Additionally or alternatively, the apparatus may include a diverter structure which is illustrated in the example embodiment depicted in FIGS. 9-12. An example embodiment of the apparatus with a shape further modified to control flow distribution is shown in FIGS. 13-16.

FIG. 1 is a block diagram of an example embodiment of a vehicle system, herein depicted as a rail vehicle 106 (such as a locomotive), configured to run on a rail 102 via a plurality of wheels 112. The rail vehicle 106 includes an engine system 100 with an engine 104. However, in other examples, engine 104 may be a stationary engine, such as in a power-plant application, or an engine in a ship propulsion system.

The engine 104 receives intake air for combustion from an intake conduit 114. The intake conduit 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack (not shown) of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

The engine system 100 includes a turbocharger 120 that is arranged between the intake conduit 114 and the exhaust passage 116. The turbocharger 120 increases air charge of ambient air drawn into the intake conduit 114 in order to provide greater charge density during combustion to increase power output and/or engine-operating efficiency. The turbocharger 120 includes a compressor (not shown in FIG. 1) which is at least partially driven by a turbine (not shown in FIG. 1). While in this case a single turbocharger is included, the system may include multiple turbine and/or compressor stages.

The engine system 100 further includes an exhaust gas treatment system 124 coupled in the exhaust passage downstream of the turbocharger 120. As further elaborated with reference to FIG. 4, exhaust gas treatment system 124 may define a plurality of distinct, and in-line, exhaust flow passages (also referred to herein as "legs") through which at least a portion of the exhaust gas stream, received from engine 10, can flow. The plurality of exhaust flow passages are positioned in parallel to each other. Furthermore, each of the plurality of exhaust flow passages may include each of the various components exhaust after-treatment components discussed below with reference to FIG. 2. The various exhaust after-treatment components of exhaust gas treatment system 124 address the various combustion by-products released in the exhaust stream during the operation of engine 104.

The rail vehicle 106 further includes a controller 148 to control various components related to the engine system 100. In one example, the controller 148 includes a computer control system. The controller 148 further includes computer readable storage media (not shown) including code for enabling on-board monitoring and control of rail vehicle operation. The controller 148, while overseeing control and management of the engine system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, boost pressure, exhaust pressure, ambient pressure, exhaust temperature, etc. Correspondingly, the controller 148 may control the engine system 100 by sending commands to various components such as fraction motors, alternator, cylinder valves, throttle, etc.

In an embodiment, the vehicle system is a locomotive system which includes an engine cab defined by a roof assembly and side walls. The locomotive system further comprises an engine positioned in the engine cab such that a longitudinal axis of the engine is aligned in parallel with a length of the cab. Further, an exhaust gas treatment system is included, and is mounted on the engine within a space defined by a top surface of an exhaust manifold of the engine, the roof assembly, and the side walls of the engine cab such that a longitudinal axis of the exhaust gas treatment system is aligned in parallel with the longitudinal axis of the engine. The exhaust gas treatment system defines a plurality of distinct exhaust flow passages aligned in parallel with the longitudinal axis of the exhaust gas treatment system and is configured to receive at least some exhaust gas from the exhaust manifold of the engine. The locomotive system further includes a turbocharger coupled to an end of the engine, the turbocharger having a vertical turbine exhaust outlet with respect to the longitudinal axis of the engine. The locomotive system further includes a plenum coupling the turbine exhaust outlet to the exhaust gas treatment system. The plenum includes a plurality of outlets aligned in a common longitudinal direction and an inlet aligned vertically with respect to the longitudinal axis of the engine. Each of the plurality of outlets corresponds to one of the plurality of exhaust flow passages of the exhaust gas treatment system, and the plenum includes an expansion chamber to expand exhaust gas from the inlet to the outlets. Detailed examples of such an embodiment are described below.

Turning to FIG. 2, it shows an engine system 200 which includes an engine 202 such as the engine 104 described above with reference to FIG. 1. FIG. 2 is approximately to-scale. The engine system further includes a turbocharger 204 mounted on a front side of the engine and an exhaust gas treatment system 208 positioned on a top portion of the engine.

In the example of FIG. 2, engine 202 is a V-engine which includes two banks of cylinders that are positioned at an angle of less than 180 degrees with respect to one another such that they have a V-shaped inboard region and appear as a V when viewed along a longitudinal axis of the engine. The longitudinal axis of the engine is defined by its longest dimension in this example. In the example of FIG. 2, and in FIGS. 4-16, the longitudinal direction is indicated by 212, the vertical direction is indicated by 214, and the lateral direction is indicated by 216. Each bank of cylinders includes a plurality of cylinders. Each of the plurality of cylinders includes an intake valve which is controlled by a camshaft to allow a flow of compressed intake air to enter the cylinder for combustion. Each of the cylinders further includes an exhaust valve which is controlled by the camshaft to allow a flow of combusted gases (e.g., exhaust gas) to exit the cylinder. In the example embodiment of FIG. 2, the exhaust gas exits the cylinder and enters an exhaust manifold positioned within the V (e.g., in an inboard orientation). In other embodiments, the exhaust manifold may be in an outboard orientation, for example, in which the exhaust manifold is positioned outside of the V.

As mentioned above, the engine system 200 includes a turbocharger 204 mounted on a front end 210 of the engine 202. In the example of FIG. 2, the front end 210 of the engine is facing toward a right side of the page. Intake air flows through the turbocharger 204 where it is compressed by a compressor of the turbocharger before entering the cylinders of the engine 202. In some examples, the engine further includes a charge air cooler which cools the compressed intake air before it enters the cylinder of the engine 202. The turbocharger is coupled to the exhaust manifold of the engine 202 such that exhaust gas exits the cylinders of the engine 202 and then enters a turbine of the turbocharger 204. As depicted in the example embodiment of FIG. 2, a turbine outlet 206 of the turbocharger is positioned such that it is aligned in parallel with the vertical axis of the engine. In such a configuration, exhaust gas that exits the turbine outlet 206 flows upward, and away from the engine, in the vertical direction 214.

In the example embodiment shown in FIG. 2, an exhaust gas treatment system 208 positioned vertically above the engine 202. The exhaust gas treatment system 208 is positioned on top of the engine 202 such that it fits within a space defined by a top surface of an exhaust manifold of the engine 202, a roof assembly 302 of an engine cab 300, and the side walls 304 of the engine cab. The engine cab 300 is illustrated in FIG. 3. The engine 202 may be positioned in the engine cab 300 such that the longitudinal axis of the engine is aligned in parallel with a length of the cab 300. As depicted in FIG. 2, a longitudinal axis of the exhaust gas treatment system is aligned in parallel with the longitudinal axis of the engine.

The exhaust gas treatment system 208 is defined by a plurality of distinct exhaust flow passages, or legs, aligned in a common direction. In the example embodiment shown in FIG. 2, the plurality of distinct exhaust flow passages includes three legs 218, 220, and 222 that are aligned in parallel with the longitudinal axis of the exhaust gas treatment system 208 and the longitudinal axis of the engine 202. Further, leg 218 and leg 222 are positioned at substantially the same height (e.g., vertical position) above the engine 202, while leg 220 is positioned at a greater vertical distance from the engine. As an example, a longitudinal plane through a center of leg 218 and leg 222 is at a vertical distance of 26 cm above the top of the engine 202 and a longitudinal plane through a center of leg 220 is at a vertical distance of 40 cm above the top of the engine 202. In other embodiments, the exhaust gas treatment system may include less than three legs or more than three legs. Further, each of the plurality of legs may be positioned at any suitable vertical distance from the top of the engine. For example, in other embodiments, each leg may be positioned at the same vertical distance from the top of the engine or each leg may be positioned at a different vertical distance from the top of the engine.

Each of the plurality of distinct exhaust flow passages may include one or more exhaust gas treatment devices. In one example embodiment, each of the plurality of exhaust flow passages includes a diesel oxidation catalyst (DOC), a diesel particulate filter (DPF) coupled downstream of the DOC, and a selective catalytic reduction (SCR) catalyst coupled downstream of the diesel particulate filter. In another example embodiment, each of the plurality of exhaust flow passages includes an SCR system for reducing $NO_x$ species generated in the engine exhaust stream and a particulate matter (PM) reduction system for reducing an amount of particulate matter, or soot, generated in the engine exhaust stream. The various exhaust gas treatment components included in the PM reduction system may include a DOC, a DPF, and an optional burner (e.g., heater), for example. The various exhaust after-treatment components included in the SCR system may include an SCR catalyst, an ammonia slip catalyst (ASC), and a structure (or region) for mixing and hydrolyzing an appropriate reductant used with the SCR catalyst, for example. The structure or region may receive the reductant from a reductant storage tank and injection system, for example.

Further, each of the plurality of distinct exhaust flow passages includes an inlet through which the exhaust gas stream enters the exhaust gas treatment system 208. For example, leg 218 includes inlet 238, leg 220 includes inlet 240, and leg 222 includes inlet 242.

In an embodiment, each of the plurality of distinct flow passages is further divided into a plurality (e.g., three) of distinct, cylindrically-shaped flow sub-passages (not shown). The exhaust flow sub-passages for each leg 218, 220, and 222 are arranged with at least some sub-passages on an upper level immediately above at least some other sub-passages on a lower level. That is, for a given exhaust flow passage (or leg), a first number of sub-passages are on top of a second number of sub-passages. This configuration enables a further compaction upon nesting of neighboring exhaust flow passages, thereby providing packaging advantages. For example, a first exhaust flow passage 218 may be configured with a smaller number (e.g., one) of sub-passages on the upper level and a larger number (e.g., two) of sub-passages on the lower level. A second exhaust passage 220 may be configured with a larger number (e.g., two) of sub-passages on the upper level and a smaller number (e.g., one) of sub-passages on the lower level. A third exhaust flow passage 222 may also be configured with a smaller number (e.g., one) of sub-passages on the upper level and a larger number (e.g., two) of sub-passages on the lower level. The first, second, and third exhaust passages are then aligned such that the second exhaust flow passage 220 (herein also referred to as middle or central leg) is nested between the first and third exhaust flow passages 218, 222 (herein also referred to as outer legs). In other words, the cylindrical shape of the substrates allows the sub-passages of the middle leg 220 to be inverted (along a top to bottom axis) with respect to the sub-passages of each of the neighboring outer legs 218, 222. In such a configuration, the inlet of the middle leg 220 is at a higher vertical position than the outer legs 218, 222, as shown in FIG. 2. This configuration provides for desirable space utilization, while the commonality of parts provided by this configuration reduces manufacturing and component costs. For example, this configuration allows for efficient packaging of circular catalytic bricks.

In the example embodiment depicted in FIG. 2, the exhaust gas treatment system 208 is mounted on the engine 202 via an engine-mounted support structure 224. The engine-mounted support structure 224 includes a substantially rectangular base 226 and a plurality of mounting legs 228 of substantially equal height. One end 230 of each mounting leg 228 is coupled to a lower surface of base 226 while another, opposite end 232 of each mounting leg 228 is coupled to the engine 202 at a plurality (e.g., four in FIG. 2) of mounting locations 234. The plurality of mounting locations 234 includes at least some locations on an engine block of engine 202, and at least some locations on a front end 210 of engine 202. In other embodiments, the exhaust gas treatment system 208 may be mounted on the engine 202 with another type of support structure, such a platform support structure, for example.

As shown in FIG. 2 the plurality of mounting legs 228 and the base 226 of the support structure 224 form a plurality of triangles 231. For example, at least three mounting legs of the plurality of mounting legs and the base form two triangles within a same plane of the support structure. Specifically, this plane is defined by the longitudinal direction 212 and the vertical direction 214. Further, the two triangles are positioned on a same side of the engine relative to a center of the V-engine (e.g., on a same side as one cylinder bank of the engine). A first triangle of the two triangles is formed by two mounting legs and a common portion of the base. This first triangle is positioned forward of cylinders of the engine. Further still, this first triangle is positioned between the cylinders and the turbocharger 204, along the longitudinal direction 212 (e.g., along the longitudinal axis of the engine). A first end of each of the two mounting legs forming the first triangle is coupled to the common portion of the base and a second end of each of the two mounting legs forming the first triangle is coupled to the front end 210. More specifically, the first end of a first leg of the two mounting legs is coupled to a first location on the common portion of the base and the first end of a second leg of the two mounting legs is coupled to a second location on the common portion of the base, the first and second locations spaced apart from one another to form the common portion of the base. Further still, the second end of the first leg and the second end of the second leg are coupled to a same location on the front end. As shown in FIG. 2, the first leg is vertically oriented such that it is perpendicular to the longitudinal axis of the engine and the second leg is angled such that it is not perpendicular to the longitudinal axis of the engine.

A second triangle, which is in the same plane as the first triangle, is formed rearward of the cylinders. As shown in FIG. 2, the second triangle is formed by a second common portion of the base, a vertical leg extending between the base and the engine block 202, and a second angled leg angling between the second common portion of the base and a point on the vertical leg (e.g., somewhere between ends of the vertical leg, such as in an area of a middle of the vertical leg). A third triangle is formed on an opposite side of the engine, relative to a longitudinal axis of the engine. For example, the third triangle is formed opposite the first triangle across the longitudinal axis. Thus, the first triangle is formed between the base and a first side of the front end, forward of a first bank of cylinders of the engine, and the third triangle is formed between the base and a second side of the front end, forward of a second bank of cylinders of the engine. The third triangle may have the same leg structure as described above with regard to the first triangle.

The example embodiments of FIGS. 4 and 5, which are approximately to scale, show an apparatus coupled between the turbocharger 204 and the exhaust gas treatment system 208. The apparatus includes and expansion plenum 250 coupled between the turbine outlet 206 of the turbocharger 204 and the exhaust gas treatment system 208. As depicted, a plenum inlet 252 is aligned with the outlet 206 of the turbocharger 204. Thus, the plenum inlet 252 is aligned along the vertical direction (e.g., parallel to a vertical axis of the engine), and as such, exhaust gas flows vertically from the turbocharger 204 to the plenum 250. The inlet 252 of the plenum 250 includes a flange with a plurality of couplings around the perimeter of the flange such that it can be coupled to a flange surrounding the turbine outlet 206. For example, the plenum inlet 252 may be bolted to the turbine outlet 206.

The plenum includes an inlet portion 254 extending upward vertically from the plenum inlet 252 in which the walls are angled slightly outward (e.g., at an angle of 5 degrees from the vertical direction). In one example, the inlet portion 254 may have a height of 1 cm. At a top of the inlet portion 254, a rear-facing wall (e.g., facing the same direction as the back end of the engine) and side walls of the inlet portion 254 bend and extend outwardly along a plane toward the exhaust gas treatment system 208, thereby forming a bottom 256 of an expansion chamber 258 of the plenum 250. Side walls 260 of the expansion chamber 258 extend substantially vertically and are angled outwardly such that they extend from the plenum inlet 252 toward the exhaust gas treatment system 208 at an angle 272 to the longitudinal direction (e.g., 30 degrees).

A front-facing wall (e.g., facing the same direction as the front end of the engine) continues to form a top portion 262 of the expansion chamber 258. The top portion 262 extends upward vertically from the top of the inlet portion 254 and then curves back toward the exhaust gas treatment system 208 such that it is angled upwardly from the plenum inlet 252 toward the exhaust gas treatment system 208 at an angle 270 to the vertical direction (e.g., 40 degrees). In the example embodiment depicted in FIGS. 4 and 5, the top portion 262 has a curved shape between the tops of the side walls 260. In other embodiments, the top portion of the expansion chamber of the plenum may have a flat shape between the tops of the side walls of the expansion chamber. In still other embodiments, the top portion of the expansion chamber may be divided into sections that are angled with respect to each other, as will be described in more detail below.

A rear-facing portion 266 of the expansion chamber 258 is perpendicular to the longitudinal axis of the exhaust gas treatment system 208. A shape of the rear-facing portion 266 is defined by the bottom 256 of the expansion chamber, the side walls 260 of the expansion chamber 258, and the top portion 262 of the expansion chamber 258. Further, the rear-facing portion 266 includes a plurality of outlets 268, each outlet corresponding to a leg of the exhaust gas treatment system 208. The outlets will be described in greater detail below.

In this way, the expansion plenum 250 expands gases in two ways (e.g., along two directions). First, the plenum 250 expands gases outward along a direction parallel to the lateral direction (indicated by 216). For example, when viewed from above, the plenum 250 has a trapezoidal shape, with parallel ends of the trapezoid parallel to the lateral direction, the narrow end on the front side and the wide end on the back side. In other words, the sides of the trapezoid, and thus the side walls of the plenum, are angled outward from the plenum inlet to the plenum outlet. Second, the plenum 250 expands gases along a direction parallel to the vertical direction (indicated by 214). For example, when the plenum 250 is viewed from the side, the plenum has V-shape, with the V pointing toward the front and opening up toward the back of the engine.

Thus, the plenum 250 is shaped to expand the flow of exhaust gas from the plenum inlet 252 to the plurality of outlets 268 as the plenum changes the flow path of the exhaust gas by approximately 90 degrees. In this way, a velocity of the exhaust gas flow that enters the plenum 250 through the plenum inlet 252 is reduced. Further, by expanding the flow of exhaust gas, backpressure on the turbocharger generated by the turbulent exhaust flow emitted from the turbocharger, and turned such that it is directed toward inlets of the exhaust gas treatment system 208, may be reduced.

FIGS. 6-8, which are approximately to scale, show example embodiments of an expansion plenum 402 with a shape similar to expansion plenum 250 described above with reference to FIGS. 4 and 5, and with a mating structure 404 operatively coupled to an outlet 410 of the plenum 402. FIGS. 6 and 7 show perspective views of the plenum 402, while FIG. 8 shows the plenum 402 coupled between a turbocharger 424 and exhaust gas treatment system 414. Mating structure 404 modifies the flow of exhaust gas through the outlet to which it is operatively coupled such that a determined amount of exhaust gas is provided to the exhaust gas treatment system 414.

In an embodiment, an apparatus includes an expansion plenum, such as plenum 402, which includes a plurality of outlets directing exhaust flow in a common first direction. The plenum further includes an inlet that is angled with respect to the first common direction and receives flow in a second direction. The apparatus further includes at least one mating structure, such as mating structure 404, which is configured to provide a determined amount of exhaust gas to an exhaust gas treatment system. By configured to provide a determined amount of exhaust gas, in an embodiment, it is meant the mating structure defines an aperture that establishes a flow rate based on a pressure differential across the aperture.

In the embodiment shown in FIGS. 6 and 7, the plenum 402 has an inlet 406 and three outlets 408, 410, and 412. Each of the outlets corresponds to a leg of the exhaust gas treatment system 414. In other embodiments in which the exhaust gas treatment system has more than three legs or less than three legs, the plenum has a corresponding number of outlets. For example, if the exhaust gas treatment system has four legs, the plenum has four outlets. The outlets of the plenum 402 may include a flange, as shown in FIGS. 6-8, with a plurality of couplings, such as holes, around the perimeter of the flange such that the outlets can be coupled to the inlets of the exhaust gas treatment system 414. For example, the outlets of the plenum 402 may be bolted to the exhaust gas treatment system 414, as shown in FIG. 8.

In the illustrated embodiments, a longitudinal plane through the center of each of the plurality of outlets is parallel with a longitudinal plane through the center of each of the other outlets. The longitudinal planes through the centers of each of the outlets are perpendicular to a plane through the inlet 406 of the plenum 402. Further, longitudinal planes through the centers of outlets 408 and 412 are in a common plane. A longitudinal plane through the center of outlet 410 is at a farther vertical position from the inlet 406 than the longitudinal planes through the centers of outlets 408 and 412. In other embodiments, longitudinal planes through the center of each of the plurality of outlets may be in a common longitudinal plane.

FIGS. 6 and 7 show mating structure 404 coupled to outlet 410 of the plenum 402. The mating structure 404 may be fitted to the plenum 402 from outside of the plenum, and as such it is an external modifier. The mating structure 404 includes a hole 422 which is defined by an elongated inner cylinder 420 that extends from an opening in a disk 416. The outer diameter of the inner cylinder 420 is such that the mating structure 404 can be tightly fitted into the outlet 410. In some embodiments, an inner surface of the inner cylinder 420 may be bell-shaped, for example, in order to "pull" the exhaust gas through the outlet. The diameter of the disk 416 is greater than the outer diameter of the inner cylinder 420, and thus, greater than the diameter of the outlet 410. In the illustrated embodiment, the diameter of the disk is substantially equal to the diameter of the flange of outlet 410. Further, the disk 416 includes a plurality of exterior couplings 418. In the illustrated embodiment, the exterior couplings 418 are in the form of holes that correspond to holes in the flange of the outlet 410. In this manner, the mating structure 404 can be bolted between the outlet 410 and the exhaust gas treatment system 414, for example.

The diameter of the hole 422 may be determined such that a desired amount of exhaust gas flows through outlet 410 under various operating conditions (e.g., exhaust gas temperature, exhaust gas pressure, etc.). For example, because the flow path of turbulent exhaust gas from the turbocharger 424 is turned by approximately 90 degrees, the central outlet 410 may offer a path of least resistance to the exhaust gas flow. As such, a greater volume of exhaust gas may enter the central leg of the exhaust gas treatment system 414, which may lead to degradation of the central leg an increase in backpressure on the turbocharger. By coupling mating structure 404 to the central outlet 410, the diameter of the hole in the outer legs may be reduced compared to the hole in the central leg, and thus the exhaust gas flow through outlet 410 may be reduced, thereby evening the distribution of exhaust gas provided by each of the three outlets 408, 410, and 412 to the exhaust gas treatment system 414.

In some embodiments, a first mating structure with a first hole is coupled to one of the outlets of the plenum, and a second mating structure with a second hole is coupled to another outlet. The first hole is defined by a first elongated cylinder that extends from an opening in a first disk. The second hole is defined by a second elongated cylinder that extends from an opening in a second disk. The diameter of the first hole may be smaller than the diameter of second hole, for example, such that a smaller volume of exhaust gas at a given temperature and pressure can pass through the first hole than the second hole. However, based on the outlets to which the first and second mating structures are coupled, the mating structures may provide substantially the same amount of exhaust gas to the exhaust gas treatment system. The first mating structure may be coupled to outlet 410 of plenum 402, and the second outlet may be coupled to outlet 408 of plenum 402, for example. In other examples, the mating structures may be positioned such that they provide different amounts of exhaust gas to the exhaust gas treatment system.

In another embodiment, a third mating structure with a third hole is coupled to a different outlet than the first and second mating structures. The third hole is defined by a third elongated cylinder that extends from an opening in a third disk. The third hole may have a different diameter than one or both of the first and second holes. As such, flow through a third outlet, such as outlet 412 may be modified.

Thus, at least one mating structure may be operatively coupled to one or more of the outlets of the plenum. In this way, exhaust gas flow through the outlets can be modified such that outlets can provide a determined amount of exhaust gas to each leg of the exhaust gas treatment system. In some examples, the outlets may be modified with the mating structures such that each of the outlets provides a substantially equivalent amount of exhaust gas to its corresponding leg of the exhaust gas treatment system. Thus, degradation the exhaust gas treatment system may be reduced and efficiency of the engine and/or exhaust gas treatment system may be increased.

Figure 11:
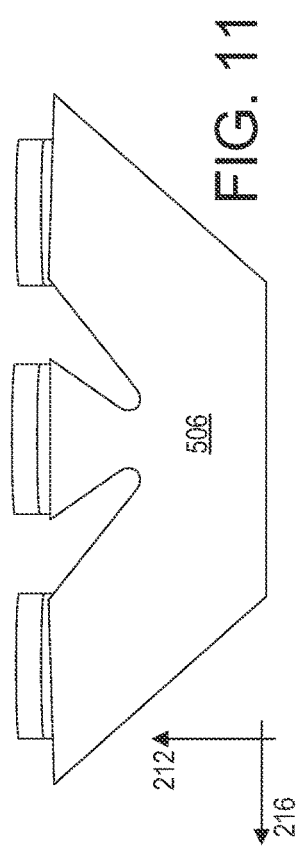
FIG. 11 shows an example embodiment of a flow area in a plenum with diverter structure.
Figure 12:
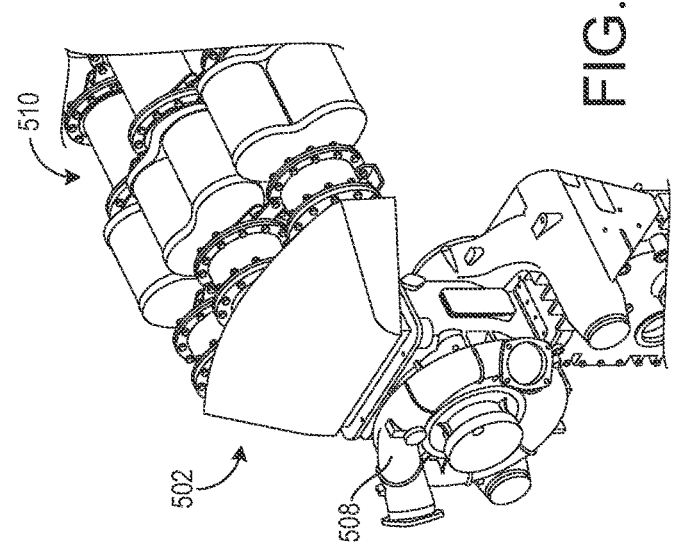
FIG. 12 shows a perspective view, approximately to scale, of an example embodiment of a plenum coupled between a turbocharger and an exhaust gas treatment system.
Figure 9:
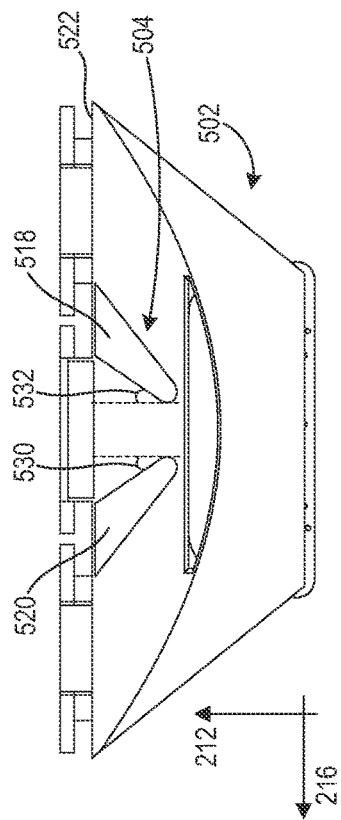
FIG. 9 shows a cut away view, approximately to scale, of an example embodiment of a plenum with a diverter structure.
Figure 10:
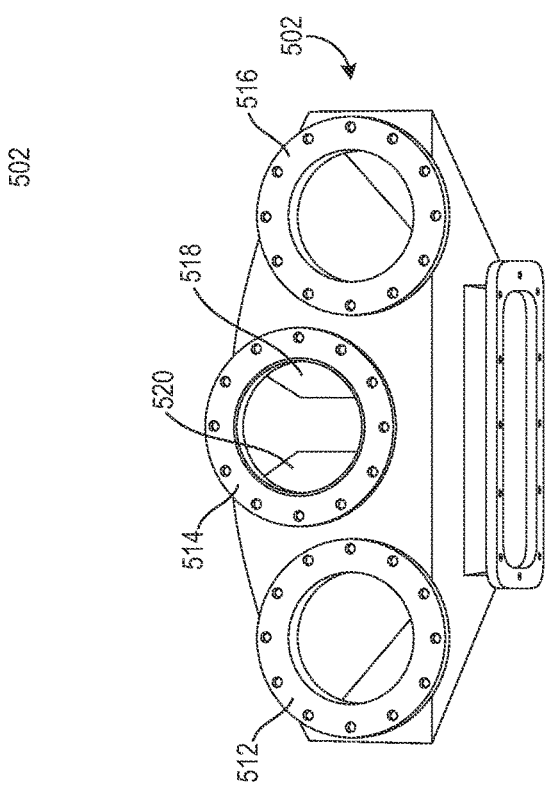
FIG. 10 shows a perspective view, approximately to scale, of an example embodiment of a plenum with a diverter structure.

FIGS. 9-12, which are approximately to scale, show example embodiments of an expansion plenum 502 with a shape similar to expansion plenum 250 described above with reference to FIGS. 4 and 5, and with a diverter structure 504 coupled within the plenum 502. FIGS. 9 and 10 show perspective views of the plenum 502, FIG. 11 shows a flow area 506 in the plenum 502, and FIG. 12 shows the plenum 502 coupled between a turbocharger 508 and an exhaust gas treatment system 510. Diverter structure 504 is configured to steer exhaust gas in the plenum 502 relative to the outlets 512, 514, and 516. As such, diverter structure 504 modifies the flow of exhaust gas through the outlet to which it is operatively coupled such that a determined amount of exhaust gas is provided to the exhaust gas treatment system 510.

As shown in the example embodiments of FIGS. 9-12, plenum 502 includes three outlets 512, 514, and 516. The outlets 512, 514, and 516 are in a similar configuration as outlets 408, 410, and 412 described above with reference to FIGS. 6-8 in which the central outlet 514 has a different vertical position than the outer outlets 512 and 516. As described above, each of the outlets corresponds to a leg of the exhaust gas treatment system 510. In other embodiments, the plenum 502 may include more than three outlets or less than three outlets, and the plurality of outlets may have any suitable configuration.

FIGS. 9-11 show the diverter structure 504 positioned within the plenum 502 such that the flow of exhaust gas is modified around the central outlet 514. The diverter structure 504 is an internal modifier. As depicted, the diverter structure 504 includes two baffles 518 and 520. In other embodiments, the diverter structure may include one baffle or more than two baffles. Each baffle may be attached to the plenum at a top of the baffle, at a bottom of the baffle, or both the bottom and the top of the baffle may be attached to the plenum, for example. Further, each baffle may be attached to a rear-facing portion of the plenum. Each baffle may have a V-shape or a U-shape angled with respect to the longitudinal direction of the plenum. Further, the diverter structure may have a V-shape or a U-shape along the longitudinal direction of the plenum. For example, in the example embodiment shown in FIG. 9, each baffle 518 and 520 is V-shaped, with a wide end of each baffle 518 and 520 (e.g., the top of the V) attached to the rear-facing portion 522 of the plenum 502. The narrow ends of baffles 518 and 520 extend into the plenum 502 toward an inlet 524 of the plenum and are angled with respect to a longitudinal axis of the plenum 502. For example, baffle 518 is at angle 530 (e.g., 34 degrees) with respect to the longitudinal axis and baffle 520 is at angle 532 (e.g., 34 degrees) with respect to the longitudinal axis. As such, the diverter structure 504 has a V-shape.

FIG. 11 shows the flow area 506 through a cross-section along the longitudinal direction of the plenum 502. With the diverter structure 504, the flow area 506 has a W-shape. In such a configuration, the flow of exhaust gas in the plenum is modified such that exhaust gas flow through the central outlet 514 is reduced. Further, the exhaust gas flow is diverted toward the outer outlets 512 and 516. As such, the distribution of exhaust gas flow through the outlets 512, 514, and 516 may be such that each outlet provides a substantially equal portion of exhaust gas to the exhaust gas treatment system 510. In another embodiment, the baffles may be positioned such that each outlet provides a different amount of exhaust gas to the exhaust gas treatment system, as desired.

In an embodiment, the diverter structure may be an active diverter structure. As such, the diverter structure may be adjusted by a controller, such as controller 148 described above with reference to FIG. 1. The position of each of the baffles of the diverter structure may be adjusted in response to an operating condition, for example. As an example, one or more of a pressure sensor and a temperature may be positioned in the exhaust gas system upstream of the exhaust gas treatment system. The sensors are in communication with the controller such that they provide feedback to the controller regarding pressure and temperature in the exhaust system such that the diverter structure can be adjusted to provide desired exhaust gas flow to the exhaust gas treatment system based on the current operating conditions.

Thus, a diverter structure with one or more baffles may be operatively coupled within the plenum. In this way, exhaust gas flow through the outlets can be modified such that outlets can provide a determined amount of exhaust gas to each leg of the exhaust gas treatment system. In some examples, the diverter structure is positioned such that each of the outlets provides a substantially equivalent amount of exhaust gas to its corresponding leg of the exhaust gas treatment system. Further, the diverter structure may be an active diverter structure that is controlled to provide a desired exhaust gas flow to each leg of the exhaust gas treatment system based on exhaust system conditions. Thus, degradation of the exhaust gas treatment system may be reduced and efficiency of the engine and/or exhaust gas treatment system may be increased.

In another embodiment, a plenum, such as plenum 250 described above with reference to FIGS. 4 and 5, may include one or more mating structures coupled to outlets of the plenum and a diverter structure within the plenum. In such an embodiment, an amount of exhaust gas flow through each of the outlets of the plenum may be more accurately controlled, for example, and/or flow modification may be increased. As such, degradation of the exhaust gas treatment system may be further reduced, and efficiency of the exhaust gas treatment system may be increased.

Figure 15:
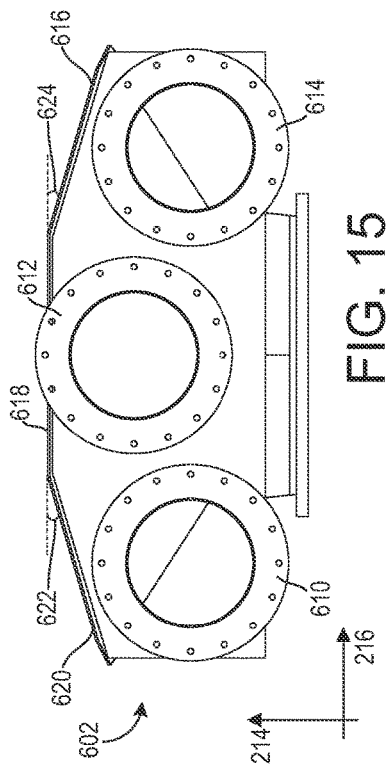
FIG. 15 shows a view, approximately to scale, of a downstream side of an example embodiment of a plenum.
Figure 16:
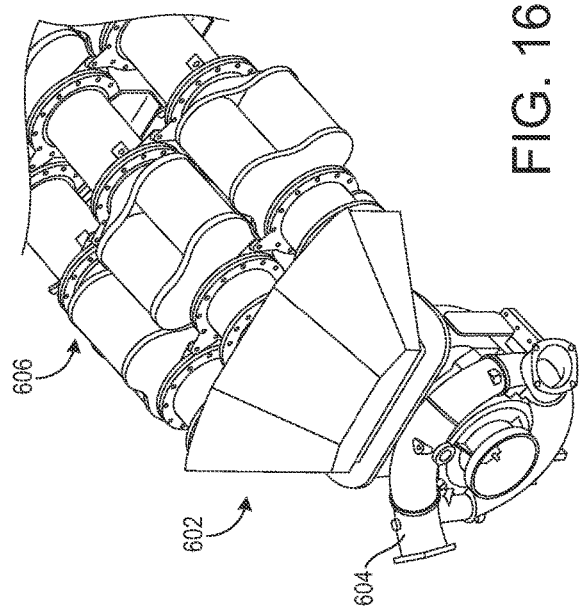
FIG. 16 shows a perspective view, approximately to scale, of an example embodiment of a plenum coupled between a turbocharger and an exhaust gas treatment system.
Figure 13:
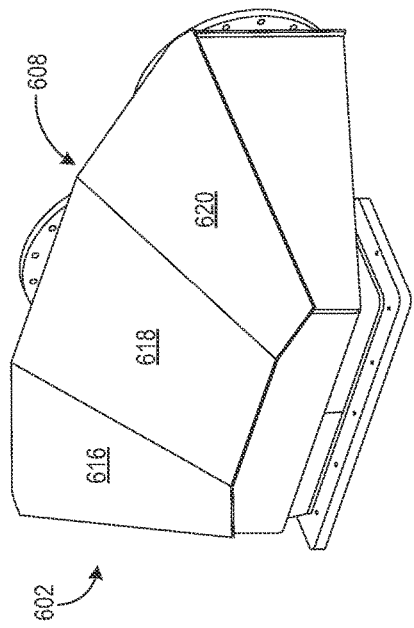
FIG. 13 shows a perspective view, approximately to scale, of an example embodiment of a plenum.
Figure 14:
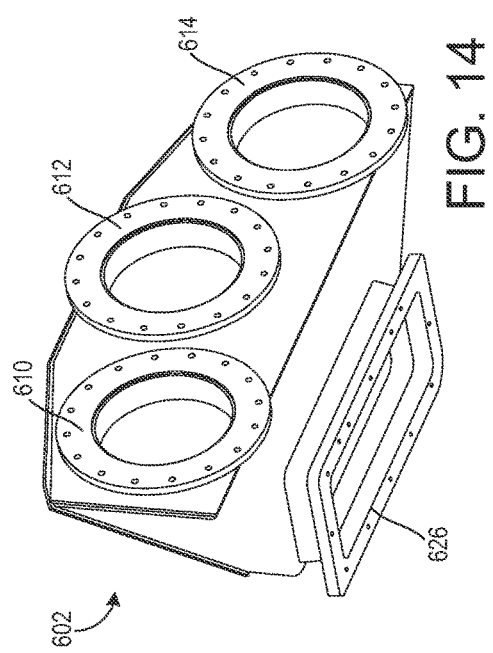
FIG. 14 shows a perspective view, approximately to scale, of an example embodiment of a plenum.

FIGS. 13-16, which are approximately to scale, show example embodiments of a plenum 602 with a modified structure. The shape of the plenum 602 is modified as compared to plenums 250, 402, and 502 described above, in that the top portion 608 of the plenum has a different shape. FIGS. 13-15 show perspective views of the plenum 602, while FIG. 16 shows the plenum 602 coupled between a turbocharger 604 and an exhaust gas treatment system 606.

As shown in the example embodiments of FIGS. 13-16, plenum 602 includes three outlets 610, 612, and 614. The outlets 610, 612, and 614 are in a similar configuration as outlets 408, 410, and 412 described above with reference to FIGS. 6-8 in which the central outlet 612 has a different vertical position than the outer outlets 610 and 614. As described above, each of the outlets corresponds to a leg of the exhaust gas treatment system 606. In other embodiments, the plenum 602 may include more than three outlets or less than three outlets, and the plurality of outlets may have any suitable configuration.

The top portion 608 of plenum 602 is divided into three sections 616, 618, and 620 that are positioned at angles with respect to each other. For example, section 620 is angled downwardly at an angle 622 (e.g., 15 degrees) with respect to section 618. Section 616 is angled downwardly at an angle 624 (e.g., 15 degrees) with respect to section 618. In such a configuration, the top portion 608 of the plenum 602 may deflect the exhaust gas flow toward the outer outlets 610 and 614 as the exhaust gas flows from the inlet 626 to the outlets 610, 612, and 614. As such, the portion of exhaust gas that flows through the central outlet 612 may be reduced, thereby evening the distribution of exhaust flow through each of the outlets 610, 612, and 614 and reducing degradation of the exhaust gas treatment system 606, for example.

In other embodiments, a plenum with a top region divided into three sections may further include one or more mating structures coupled to the outlets of the plenum and/or a diverter structure. In one example, a plenum with a modified shape, as described above, may include an active diverter structure. In this way, an amount of exhaust gas flow through each of the outlets of the plenum may be more precisely controlled, for example. As such, degradation of the exhaust gas treatment system may be further reduced, and efficiency of the engine system and/or exhaust gas treatment system may be increased.

Thus, an apparatus including an expansion plenum may be coupled between a turbocharger and an exhaust gas treatment system in a vehicle such as a locomotive. An amount of space with the engine cab of the locomotive may require the flow of exhaust gas to be turned from a vertical flow direction out of the turbocharger to a longitudinal flow direction into the exhaust gas treatment system. The plenum is configured to change the flow direction of the exhaust gas, as well as to expand and divert the flow of exhaust such that the flow of exhaust gas from the turbocharger is substantially equally distributed between outlets of the plenum which are coupled to distinct flow passages of the exhaust gas treatment system. In this way, degradation of the engine system may be reduced, as described above.

In this written description, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An engine system, comprising:
   an engine;
   a support structure including a base and a plurality of mounting legs, a first end of each mounting leg of the plurality of mounting legs coupled to the base and an opposite, second end of each mounting leg of at least a portion of the plurality of mounting legs coupled to the engine, where at least four mounting legs of the plurality of mounting legs and the base form two triangles within a same plane of the support structure; and
   an exhaust passage positioned vertically above and mounted on the engine via the support structure.

2. The engine system of claim 1, wherein a first triangle of the two triangles is formed by two mounting legs of the plurality of mounting legs and a common portion of the base.

3. The engine system of claim 2, wherein the first end of each of the two mounting legs forming the first triangle are coupled to the common portion of the base and a second end of each of the two mounting legs forming the first triangle are coupled to a front end of the engine.

4. The engine system of claim 1, wherein the engine includes a plurality of cylinders and wherein at least one of the two triangles is disposed forward of the plurality of cylinders along a longitudinal axis of the engine and relative to a front end of the engine.

5. The engine system of claim 4, wherein the engine is a V-engine where the plurality of cylinders form two banks of cylinders and further comprising an exhaust manifold positioned within a V of the V-engine, between the two banks of cylinders, where the exhaust manifold is coupled between the plurality of cylinders and a turbocharger.

6. The engine system of claim 1, further comprising a turbocharger coupled to a front end of the engine and mounted forward of the two triangles along a longitudinal axis of the engine and relative to the front end.

7. The engine system of claim 6, wherein an axis of the turbocharger is parallel to the longitudinal axis of the engine.

8. The engine system of claim 1, wherein the first end of each mounting leg is coupled to a lower surface of the base and wherein the second end of each mounting leg of at least the portion of the plurality of mounting legs is coupled to one of an engine block and a front end of the engine and wherein the base of the support structure runs along a length of the exhaust passage.

9. The engine system of claim 1, wherein the two triangles are asymmetrically positioned on one side of the engine system and wherein a shared component of the support structure forms one leg of each of the two triangles.

10. An engine system, comprising:
    an engine including an engine block and a front end;
    a support structure including a base and a plurality of mounting legs coupling the base to the engine, where a first mounting leg of the plurality of mounting legs is coupled between the base, at a first location on the base, and a first mounting location on the front end and a second mounting leg of the plurality of mounting legs is coupled between the base, at a second location on the base, and the first mounting location on the front end, where a section of the base, between the first location and the second location, the first mounting leg, and the second mounting leg form a first triangle on a first side of the engine; and
    an exhaust passage supported and positioned vertically above the engine, relative to a vertical axis, by the support structure.

11. The engine system of claim 10, wherein the plurality of mounting legs form a second triangle in a same plane of the support structure as the first triangle.

12. The engine system of claim 10, wherein the plurality of mounting legs form a second triangle, where both the first triangle and the second triangle are positioned forward of cylinders relative to the front end.

13. The engine system of claim 10, wherein at least one of the first mounting leg and the second mounting leg is angled relative to the vertical axis, between the base and the front end.

14. The engine system of claim 10, wherein the engine is a V-engine including a first bank of cylinders and a second bank of cylinders and wherein the first mounting location is positioned on a first side of the front end, forward of the first bank of cylinders.

15. The engine system of claim 14, wherein the base is a rectangular base and wherein the section of the base forming the first triangle is part of a first side of four sides of the rectangular base, where the first side runs along a length of the first bank of cylinders relative to a longitudinal axis of the engine.

16. The engine system of claim 14, wherein a third mounting leg of the plurality of mounting legs is coupled between the base, at a third location on the base, and a second mounting location on the front end and a fourth mounting leg of the plurality of mounting legs is coupled between the base, at a fourth location on the base, and the second mounting location on the front end, where a second section of the base, between the third location and the fourth location, the third mounting leg, and the fourth mounting leg form a second triangle on a second side of the engine, where the second mounting location is positioned on a second side of the front end, opposite the first side of the front end relative to an exhaust manifold positioned within a V of the V-engine, where the second triangle is positioned forward of the second bank of cylinders.

17. The engine system of claim 10, further comprising a turbocharger mounted to the front end of the engine and wherein the first triangle is positioned between the turbocharger and cylinders of the engine, with respect to a longitudinal axis of the engine.

18. An engine system, comprising:
a V-engine including a front end and an engine block including a first bank of cylinders and a second bank of cylinders;
a turbocharger positioned at the front end of the V-engine and coupled to the first bank of cylinders and the second bank of cylinders;
a support structure including a base and a plurality of mounting legs coupled between the base and the front end, where two legs of the plurality of mounting legs are mounted to a same mounting location on the front end and are positioned between the turbocharger and the first bank of cylinders in a plane arranged along a longitudinal axis of the V-engine; and
an exhaust passage supported by, and disposed vertically above, the V-engine via the support structure, where a longitudinal axis of the exhaust passage is aligned in parallel with the longitudinal axis of the V-engine.

19. The engine system of claim 18, wherein at least two legs of the plurality of mounting legs form a first triangle, and another two legs of the plurality of mounting legs form a second triangle, where both the first triangle and the second triangle are arranged in the plane, where the plane is defined by the longitudinal axis of the V-engine and a vertical axis arranged perpendicular to the longitudinal axis of the V-engine.

20. The engine system of claim 19, wherein the first triangle and the second triangle are arranged on a first side of the V-engine including the first bank of cylinders and the plurality of mounting legs form a third triangle and a fourth triangle arranged in a same, second plane with one another on a second side of the V-engine including the second bank of cylinders.

21. The engine system of claim 1, further comprising an exhaust gas treatment system coupled in the exhaust passage and positioned vertically above and mounted on the engine via the support structure, wherein the exhaust gas treatment system comprises one or more legs coupled to a plenum and configured to receive at least a portion of an exhaust gas stream from the engine through the plenum, each of the one or more legs of the exhaust gas treatment system including one or more respective exhaust gas treatment devices that are configured to treat the exhaust gas stream.

22. The engine system of claim 10, further comprising an exhaust gas treatment system coupled in the exhaust passage and positioned vertically above and mounted on the engine via the support structure, wherein the exhaust gas treatment system comprises one or more legs coupled to a plenum and configured to receive at least a portion of an exhaust gas stream from the engine through the plenum, each of the one or more legs of the exhaust gas treatment system including one or more respective exhaust gas treatment devices that are configured to treat the exhaust gas stream.

23. The engine system of claim 18, further comprising an exhaust gas treatment system coupled in the exhaust passage and disposed vertically above the V-engine and supported by the support structure, wherein the exhaust gas treatment system comprises one or more legs coupled to a plenum and configured to receive at least a portion of an exhaust gas stream from the V-engine through the plenum, each of the one or more legs of the exhaust gas treatment system including one or more respective exhaust gas treatment devices that are configured to treat the exhaust gas stream.

* * * * *